(12) United States Patent
Östrup et al.

(10) Patent No.: US 10,856,352 B2
(45) Date of Patent: Dec. 1, 2020

(54) APPARATUSES AND METHODS THEREIN FOR ENABLING ESTABLISHMENT OF A CONNECTION BETWEEN A WIRELESS COMMUNICATIONS DEVICE AND A CORE NETWORK

(71) Applicant: Telefonaktiebolaget LM Ericsson (publ), Stockholm (SE)

(72) Inventors: Peter Östrup, Linköping (SE); Stefano Savarino, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 15/577,192

(22) PCT Filed: Jun. 30, 2015

(86) PCT No.: PCT/SE2015/050769
§ 371 (c)(1),
(2) Date: Nov. 27, 2017

(87) PCT Pub. No.: WO2017/003333
PCT Pub. Date: Jan. 5, 2017

(65) Prior Publication Data
US 2018/0160466 A1 Jun. 7, 2018

(51) Int. Cl.
*H04W 28/08* (2009.01)
*H04W 60/04* (2009.01)
(Continued)

(52) U.S. Cl.
CPC .......... *H04W 76/18* (2018.02); *H04W 28/08* (2013.01); *H04W 60/04* (2013.01); *H04W 76/10* (2018.02);
(Continued)

(58) Field of Classification Search
CPC ..... H04W 28/08; H04W 60/04; H04W 76/10; H04W 76/18; H04W 92/12; H04W 88/08; H04W 88/10; H04W 92/10; H04W 92/14
(Continued)

(56) References Cited

U.S. PATENT DOCUMENTS

2010/0120399 A1* 5/2010 Guo .................. H04W 8/08
455/411
2011/0269499 A1* 11/2011 Vikberg ............ H04W 28/08
455/524
(Continued)

FOREIGN PATENT DOCUMENTS

EP 2861032 A1 4/2015

OTHER PUBLICATIONS

International Search Report and Written Opinion dated Feb. 9, 2016 for International Application Serial No. PCT/SE2015/050769, International Filing Date: Jun. 30, 2015 consisting of 12-pages.
(Continued)

*Primary Examiner* — Melvin C Marcelo
*Assistant Examiner* — Natali Pascual Peguero
(74) *Attorney, Agent, or Firm* — Patent Portfolio Builders, PLLC

(57) ABSTRACT

A method performed by a radio network node for enabling establishment of a connection between a wireless communications device and a core network, which network node and wireless communications device operate in a wireless communications network including the core network. The network node obtains a request from the wireless communications device to establish a connection to a first core network node included in the core network. The first core network node is not available for connection to the wireless communications device. The network node provides the wireless communications device with a rejection of the
(Continued)

request to establish the connection to the first core network node, which rejection includes an indication to initiate a Tracking Area Update, TAU.

15 Claims, 10 Drawing Sheets

(51) Int. Cl.
| | |
|---|---|
| *H04W 76/18* | (2018.01) |
| *H04W 92/12* | (2009.01) |
| *H04W 76/10* | (2018.01) |
| *H04W 92/10* | (2009.01) |
| *H04W 92/14* | (2009.01) |
| *H04W 88/08* | (2009.01) |
| *H04W 88/10* | (2009.01) |

(52) U.S. Cl.
CPC ............ *H04W 92/12* (2013.01); *H04W 88/08* (2013.01); *H04W 88/10* (2013.01); *H04W 92/10* (2013.01); *H04W 92/14* (2013.01)

(58) Field of Classification Search
USPC .................................................. 370/235, 329
See application file for complete search history.

(56) References Cited

U.S. PATENT DOCUMENTS

2012/0282941 A1* 11/2012 Lu ......................... H04W 76/22
455/452.1

2014/0347990 A1* 11/2014 Chimbili ............... H04W 28/08
370/235

OTHER PUBLICATIONS

3GPP TSG RAN WG3 #88, R3-151103, Title: "RRC establishment rejection", Source: Samsung, Agenda Item: 13.2, Document for: Discussion and approval, Conference Location and Date: Fukuoka, Japan May 25-29, 2015 consisting of 4-pages.
3GPP TS 36.331 v12.5.0 (Mar. 2015), 3rd Generation Partnership Project; Technical Specification Group Radio Access Network; Evolved Universal Terrestrial Radio Access (E-UTRA); Radio Resource Control (RRC); Protocol specification (Release 12), Valbonne, France Mar. 2015 consisting of 445-pages.
Supplementary European Search Report dated Mar. 21, 2018 for EP Application No. 15 89 7285 filed on Jun. 30, 2015, consisting of 4-pages.
3GPP TS 23.401 V9.15.0; 3rd Generation Partnership Project; Technical Specification Group Services and System Aspects; General Packet Radio Service (GPRS) enhancements for Evolved Universal Terrestrial Radio Access Network (E-UTRAN) access (Release 9); Mar. 2013, consisting of 256-pages.
3GPP TS 36.413 V12.5.0; 3rd Generation Partnership Project; Technical Specification Group Radio Access Network; Evolved Universal Terrestrial Radio Access Network (E-UTRAN) S1 Application Protocol (S1AP) (Release 12); Mar. 2015, consisting of 301-pages.
Office Action issued in corresponding EP Application No. 15897282. 8; dated Apr. 23, 2018; 06 pages. The reference not cited therein has been previously made of record.

* cited by examiner

APPARATUSES AND METHODS THEREIN FOR ENABLING ESTABLISHMENT OF A CONNECTION BETWEEN A WIRELESS COMMUNICATIONS DEVICE AND A CORE NETWORK

CROSS-REFERENCE TO RELATED APPLICATIONS

This application is a Submission Under 35 U.S.C. § 371 for U.S. National Stage Patent Application of International Application Number: PCT/SE2015/050769, filed Jun. 30, 2015 entitled "APPARATUSES AND METHODS THEREIN FOR ENABLING ESTABLISHMENT OF A CONNECTION BETWEEN A WIRELESS COMMUNICATIONS DEVICE AND A CORE NETWORK," the entirety of which is incorporated herein by reference.

TECHNICAL FIELD

Embodiments herein relate to apparatuses and methods therein for enabling establishment of a connection between a wireless communications device and a core network.

BACKGROUND

Wireless communications devices such as User Equipments (UE) are also known as e.g. Mobile Stations (MS), mobile terminals, and wireless terminals. Wireless communications devices are enabled to communicate wirelessly in a wireless communications network or wireless communication system, sometimes also referred to as a cellular radio system or cellular networks. The communication may be performed e.g. between two wireless communications devices, between a wireless communications device and a regular telephone and/or between a wireless communications device and a server via a Radio Access Network (RAN) and possibly one or more Core Networks (CN), comprised within the wireless communications network.

Examples of wireless communication systems are Long Term Evolution (LTE), Universal Mobile Telecommunications System (UMTS) and Global System for Mobile communications (GSM).

Wireless communications devices may further be referred to as mobile telephones, cellular telephones, laptops, or tablets with wireless capability, just to mention some further examples. The wireless communications devices in the present context may be, for example, portable, pocket-storable, hand-held, computer-comprised, or vehicle-mounted mobile devices, enabled to communicate voice and/or data, via the RAN, with another entity, such as another wireless communications device or a server.

The wireless communications network covers a geographical area which is divided into cell areas, wherein each cell area being served by an access node such as a Base Station (BS), e.g. a Radio Base Station (RBS), which sometimes may be referred to as e.g. eNodeB (eNB), NodeB, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless communications devices within range of the base stations. In the context of this disclosure, the expression Downlink (DL) is used for the transmission path from the base station to the wireless communications device. The expression Uplink (UL) is used for the transmission path in the opposite direction i.e. from the wireless communications device to the base station.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein the radio base station nodes are directly connected to the EPC network, i.e. a radio network controller concept as realized in UMTS with a Radio Network Controller (RNC) does not exist. In general, in EPS the functions of an RNC are distributed between eNBs and the core network. As such, the RAN of an EPS has an essentially "flat" architecture comprising radio base stations without being controlled by RNCs.

A simplified architecture of the LTE system is shown in FIG. 1a, including eNBs and evolved packet core nodes. The evolved packet core nodes are illustrated as Mobility Management Entities (MMEs) in FIG. 1a. The eNBs are connected with the MMEs with S1 connections. S1 is an interface between the eNBs and the MME. The MME is used as a control node. For example, the MME is responsible for idle mode UE tracking and paging procedure including retransmissions. The MME is further involved in the bearer activation/deactivation process and is also responsible for choosing a Serving GateWay (SGW) for a UE at the initial attach and at time of intra-LTE handover involving evolved packet core node relocation. The MME is further responsible for authenticating the UE or user of the UE.

FIG. 1b is a signalling diagram illustrating how a UE may try to access the LTE network according to prior art, e.g. as described in chapter 5.3.3. in 3GPP TS 36.331 V12.5.0. The UE sends 101 a Radio Resource Connection (RRC) Request to the eNB. The RRC Request is a request to establish a connection to the network, and in particular to an MME. The RRC request may point to a particular MME, e.g. derived from the comprised SAE Temporary Mobile Subscriber Identity (S-TMSI), which is the initial UE identity. E.g. an MME Code (MMEC) may be derived from the S-TMSI. The particular MME may for example have been serving the UE corresponding to the comprised S-TMSI during the last RRC connection of the UE.

If the particular MME for some reason is unavailable for connection to the UE the eNB will send 102 an RRC Connection Reject.

The UE will then wait for some time and try to connect 103, 105 again through the same procedure. If the particular MME is still unavailable the same rejection 104, 106 may repeat itself several times. This causes a delay in the access of the UE and also unnecessary signalling in the wireless network.

SUMMARY

In the prior art LTE network the eNB does not provide the UE with a cause for its rejection of the request to access the LTE network. Therefor the UE will repeat its mistake again and again. This causes delay in the access of the UE and unnecessary signalling in the wireless network.

An object of embodiments herein is to improve the performance of a wireless communications network.

According to a first aspect of embodiments herein, the object is achieved by a method performed by a network node for enabling establishment of a connection between a wireless communications device and a core network. The network node and wireless communications device operate in a wireless communications network comprising the core network.

The network node obtains a request from the wireless communications device to establish a connection to a first core network node comprised in the core network. The first core network node is not available for connection to the wireless communications device.

The network node further provides the wireless communications device with a rejection of the request to establish the connection to the first core network node. The rejection comprises an indication to initiate a Tracking Area Update, TAU.

According to a second aspect of embodiments herein, the object is achieved by a method performed by a wireless communications device for enabling establishment of a connection between the wireless communications device and a core network. The network node and wireless communications device operate in a wireless communications network comprising the core network.

The wireless communications device provides the network node with a request to establish a connection to a first core network node. The first core network node is not available for connection to the wireless communications device.

The wireless communications device obtains a rejection of the request to establish a connection to the first core network node from the network node. The rejection comprises an indication to initiate a Tracking Area Update, TAU.

The wireless communications device further provides the network node with a request to establish a connection to any core network node operating in the core network and available for connection to the wireless communications device, in response to the obtained indication to initiate the TAU.

According to a third aspect of embodiments herein, the object is achieved by a network node configured to perform the method according to the first aspect.

According to a fourth aspect of embodiments herein, the object is achieved by a wireless communications device configured to perform the method according to the second aspect.

The indication to initiate the TAU means that the wireless communications device shall access the wireless communications network and perform the TAU without information pointing to a particular core network node. Since the wireless communications device is provided with the indication to initiate the TAU together with the rejection of the request to establish the connection to the first core network node the wireless communications device is able to access the wireless communications network and perform the TAU without information pointing to a particular core network node. At the next access attempt the network node will redirect the wireless communications device to an available core network node.

Advantages of embodiments herein are faster access to the wireless communications network and less signalling in the wireless communications network which improves the performance of the wireless communications network.

BRIEF DESCRIPTION OF THE DRAWINGS

Examples of embodiments herein are described in more detail with reference to attached drawings in which.

DETAILED DESCRIPTION

Figure 1A:
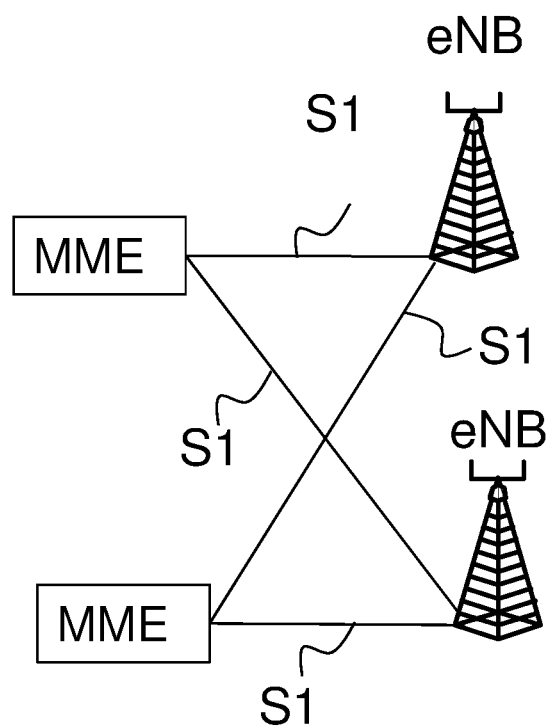
FIG. 1a is a schematic block diagram illustrating an LTE wireless communications network according to prior art.
Figure 1B:
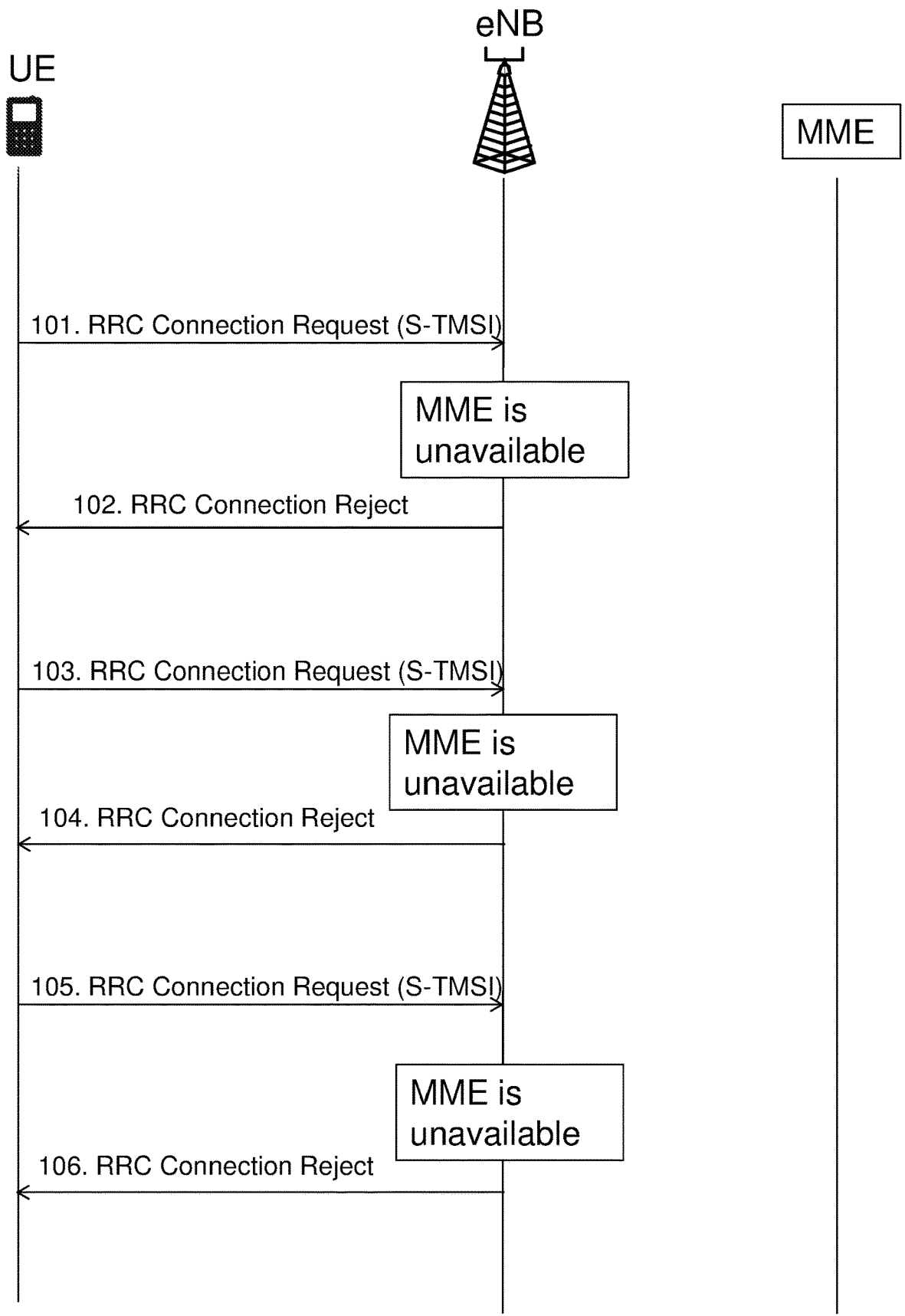
FIG. 1b is a signalling diagram illustrating a method for accessing the wireless communications network according to prior art.
Figure 2A:
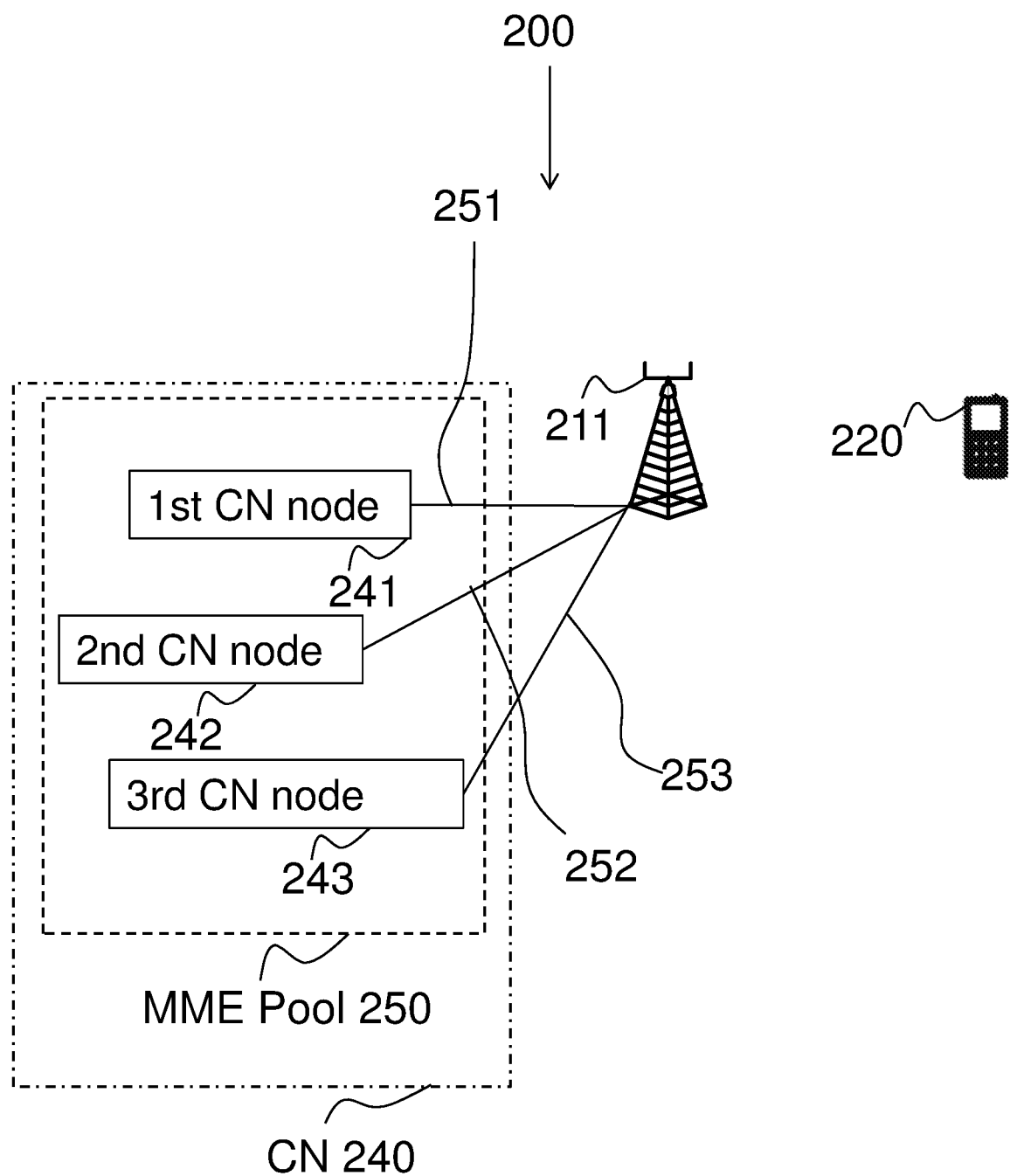
FIG. 2a is a schematic block diagram illustrating a wireless communications network in which embodiments herein may be implemented.

Embodiments herein relate to wireless communication networks in general. FIG. 2a is a schematic block diagram depicting a wireless communications network 200 also known as a radio communications network, a telecommunications network or similar. The wireless communications network 200 may comprise one or more RAN and one or more CN. The wireless communications network 200 may use a number of different technologies, such as LTE, LTE-Advanced, Wideband Code Division Multiple Access (WCDMA), Global System for Mobile communications/Enhanced Data rate for GSM Evolution (GSM/EDGE), Worldwide Interoperability for Microwave Access (Wi-MAX), Bluetooth Low Energy (BLE), Wi-Fi or Ultra Mobile Broadband (UMB), just to mention a few possible implementations. In embodiments herein the wireless communications network 200 will be exemplified with an LTE network. However, embodiments are also applicable to other wireless communications networks in which Tracking Area Update (TAU) or similar processes are supported.

In the wireless communications network 200, network nodes capable of communicating with wireless communications devices operate. For example, a network node 211 capable of communicating with wireless communications devices operates in the wireless communications network 200. The network node 211 is configured to operate in the wireless communications network 200. In some embodiments the network node 211 is a network node capable of radio communication, i.e. a radio network node such as a base station. The network node 211 may also be referred to as a radio base station and e.g. an eNB, eNode B, a base transceiver station, Access Point Base Station, base station router, or any other network unit capable of communicating with wireless communications devices.

In some other embodiments the network node 211 is a network node that communicates with the wireless communications devices via a radio network node. In this case the network node 211 may for example be a Radio Network Controller (RNC) in an UMTS network. The RNC is not shown in FIG. 2.

A wireless communications device 220, also known as a mobile station, wireless device, wireless communications device and/or a wireless terminal, operates in the wireless communications network 200. For example, the wireless communications device 220 may communicate with the wireless communications network 200 via radio network nodes, such as the network node 211. The wireless communications device 220 may for example communicate with the network node 211. There may of course be more than one wireless communications device in the wireless communications network 200.

It should be understood by the person skilled in the art that the term "wireless communications device" is a non-limiting term which means for example any wireless terminal, user equipment, Station (STA), Machine Type Communication (MTC) device, a Device to Device (D2D) terminal, or node e.g. Personal Digital Assistant (PDA), laptop, mobile, sensor, relay, mobile tablets or even a small base station.

The wireless communications device 220 may further be configured to communicate with a core network 240 comprised in the wireless communications network 200. The core network 240 provides various services to wireless communications devices, such as the wireless communications device 220, who are connected to the wireless communications network 200. Some of these services are provided by MMEs. An MME functions as a control node and is e.g. responsible for tracking of wireless communications devices being in idle mode and paging procedures including retransmissions. The MME is further involved in the bearer activation/deactivation process and is also responsible for choosing a Serving GateWay (SGW) for a wireless communications device at the initial attach and at time of intra-LTE handover involving CN node relocation. The MME is also responsible for authenticating the wireless communication device.

The core network 240 comprises several core network nodes, such as a first core network node 241. The first core network node 241 is exemplified herein as an MME. The core network 240 comprises further core network nodes 242, 243 which also are exemplified as MMEs herein. In FIG. 2a the further core network nodes 242, 243 comprises a second core network node 242 and a third core network node 243.

In some embodiments when the core network nodes 241, 242, 243 are MMEs, the core network nodes 241, 242, 243 are comprised in an MME Pool 250. An MME Pool is a group of MMEs all connected to all eNBs in an MME Pool Area. The mobiles connected to each eNB can be served by different MMEs in the Pool, to achieve load balancing between the MMEs and redundancy in case of MME unavailability.

In an example scenario of embodiments herein, the first core network node 241 is for some reason not available for connection to the wireless communications device 220. One such reason may be that the first core network node 241 is overloaded.

The other core network nodes 242, 243 are available for connection to the wireless communications device 220.

The network node 211 may be configured to communicate with the core network nodes via one or more connections. The connections may be S1 connections in LTE. For example, a connection between the network node 211 and the first core network node 241 is referred to as a first connection 251 herein. Further, there are other connections 252, 253 between the network node 211 and the core network nodes 242, 243 that are available for connection to the wireless communications device 220.

Figure 2B:
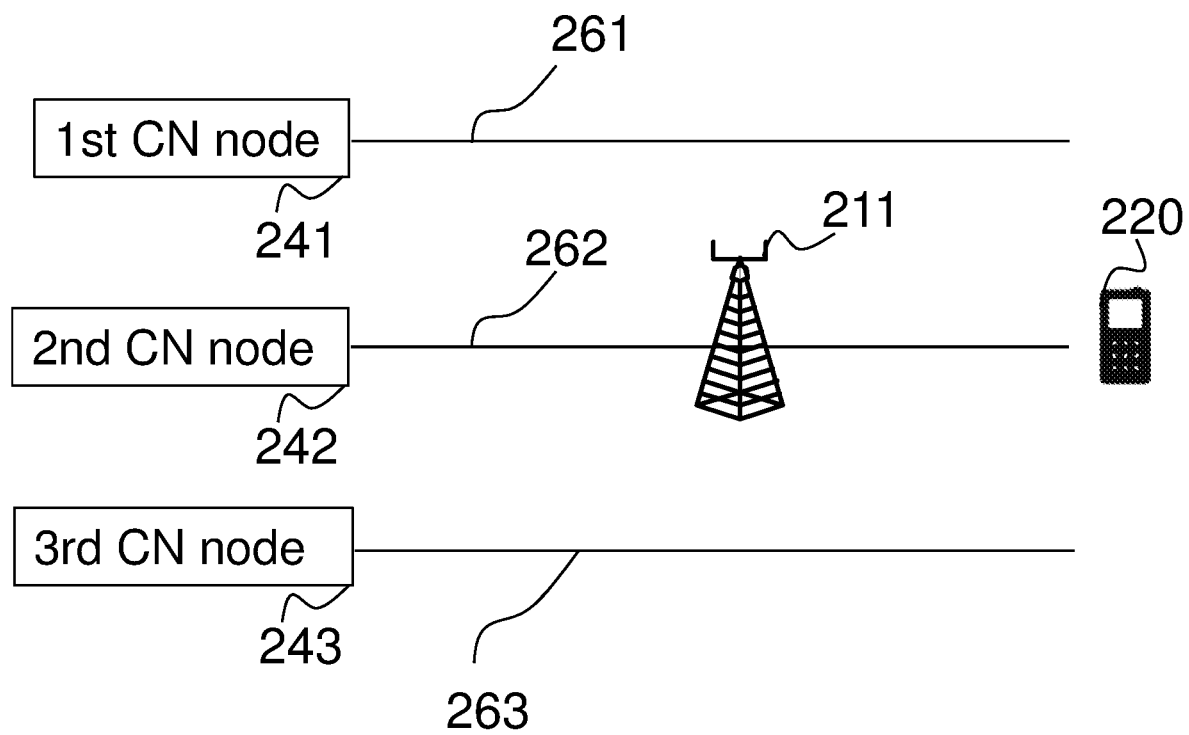
FIG. 2b is a schematic block diagram illustrating further details of a wireless communications network in which embodiments herein may be implemented.

FIG. 2b illustrates possible connections 261, 262 and 263 between the wireless communications device 220 and the core network nodes 241, 242, 243. Note that in scenarios herein the connection 261 between the wireless communications device 220 and the first core network node 241 is not possible to set up since the first core network node 241 is not available for connection to the wireless communications device 220.

Further, the connections 261, 262 and 263 between the wireless communications device 220 and the core network nodes 241, 242, 243 may be logical connections.

It should be noted that the following embodiments are not mutually exclusive. Components from one embodiment may be tacitly assumed to be present in another embodiment and it will be obvious to a person skilled in the art how those components may be used in the other exemplary embodiments.

In embodiments herein the network node 211, such as an eNB, provides a rejection of a request to access the wireless communications network 200 with an indication to initiate a TAU. E.g. in some embodiments herein an RRC Connection Reject message comprise a Cause IE indicating 'loadbalancingTAURequired', i.e. that load balancing by means of TAU is required. In this way, a connection request from the wireless communications device 220, such as a UE, that is pointing to the first core network node 241, which is not available for connection to the wireless communications device 220, is rejected. At the same time a load balancing TAU procedure is initiated. The TAU procedure means that the wireless communications device 220 shall access the wireless communications network and perform a TAU without information pointing to a particular core network node, such as a particular MME. At the next access attempt the wireless communications device 220 will be redirected to a core network node which is available for connection to the wireless communications device 220.

The wireless communications device 220 is able to initiate the TAU without first being connected to the core network 240 which improves the performance of the wireless communications network 200.

In embodiments herein the wireless communications device 220 wants to access the wireless communications network 200. The wireless communications device 220 tries to access the wireless communications network 200 by providing the network node 211 with an RRC Connection Request. The RRC Connection Request points to a specific core network node, namely the first core network node 241. The RRC Connection Request may point to the first core network node 241 by comprising the S-TMSI for the wireless communications device 220.

However, since the network node 211 knows that the first core network node 241 is not available for connection to the wireless communications device 220 the network node 211 will not grant the request. The network node 211 may know that the first core network node 241 is not available for connection to the wireless communications device 220 due to an obtained indication that the first core network node 241 is not available for connection to the wireless communications device 220. Such an indication may for example be an MME overload start message from the first core network node 241.

The network node 211 then rejects the request from the wireless communications network 200 by providing the wireless communications device 220 with an RRC Connection Reject. Instead of just providing the wireless communications device 220 with the rejection, the network node 211 also provides the wireless communications device 220 with an indication to initiate a TAU.

The wireless communications device 220 then tries to access the network again, this time without pointing out a specific core network node, and initiates a TAU procedure. Thus, embodiments herein prevent the wireless communications device 220 from being rejected from accessing the wireless communications network 200 more than one time and thus improves the performance of the wireless communications network 200.

Embodiments herein will now be described in more detail with different alternatives.

A method is disclosed herein for enabling establishment of a connection between the wireless communications device 220 and the core network 240.

Actions for enabling establishment of a connection between the wireless communications device 220 and the core network 240 according to embodiments herein will now be described in more detail in relation to FIG. 3, FIG. 4 and FIG. 5.

Figure 3:
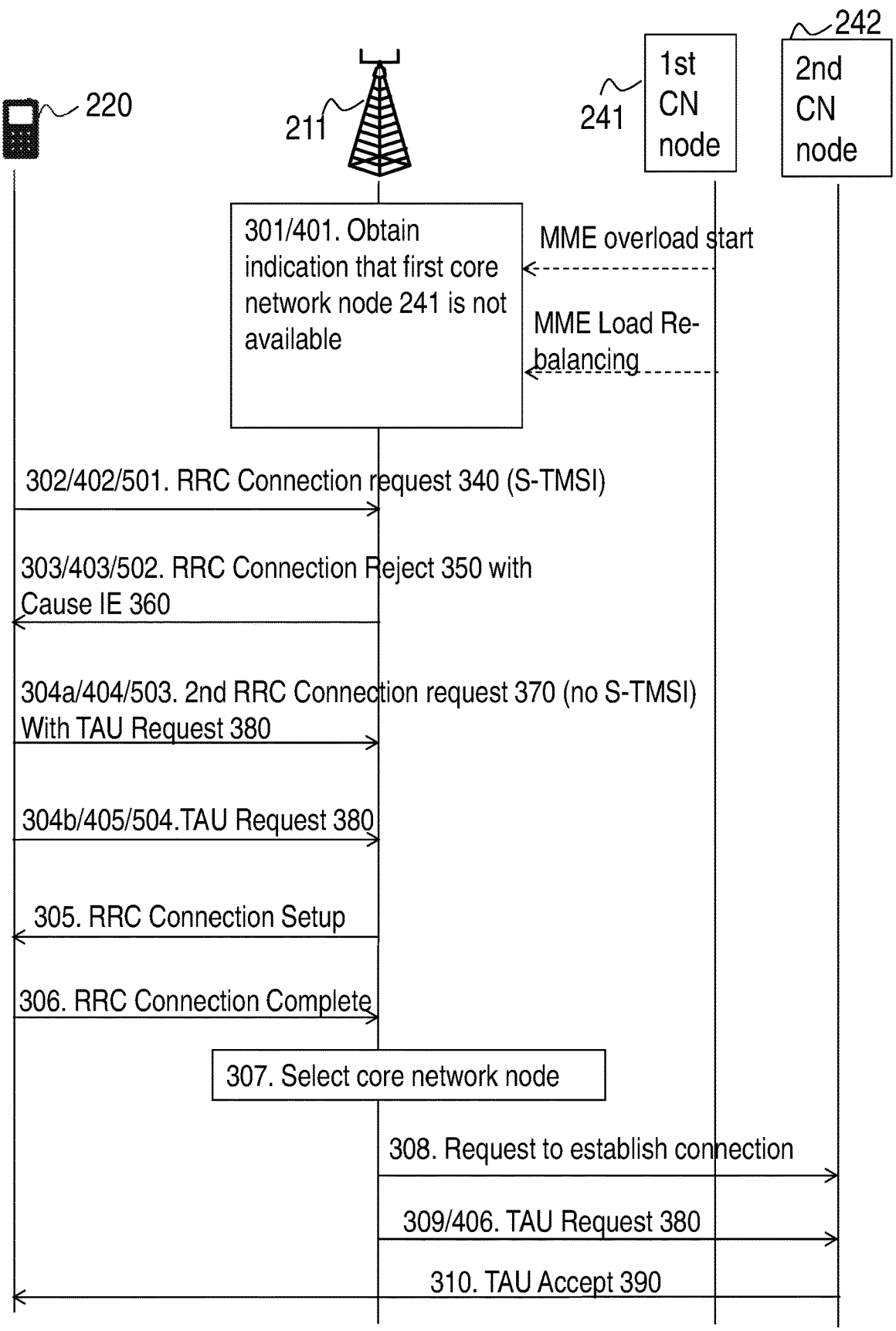
FIG. 3 is a combined signalling diagram and flow chart illustrating embodiments of a method performed in a wireless communications network.

FIG. 3 is a combined signalling diagram and flow chart that describes a method for enabling establishment of a connection between the wireless communications device 220 and the core network 240 according to embodiments herein. Actions 301-310 relate to FIG. 3.

Figure 4:
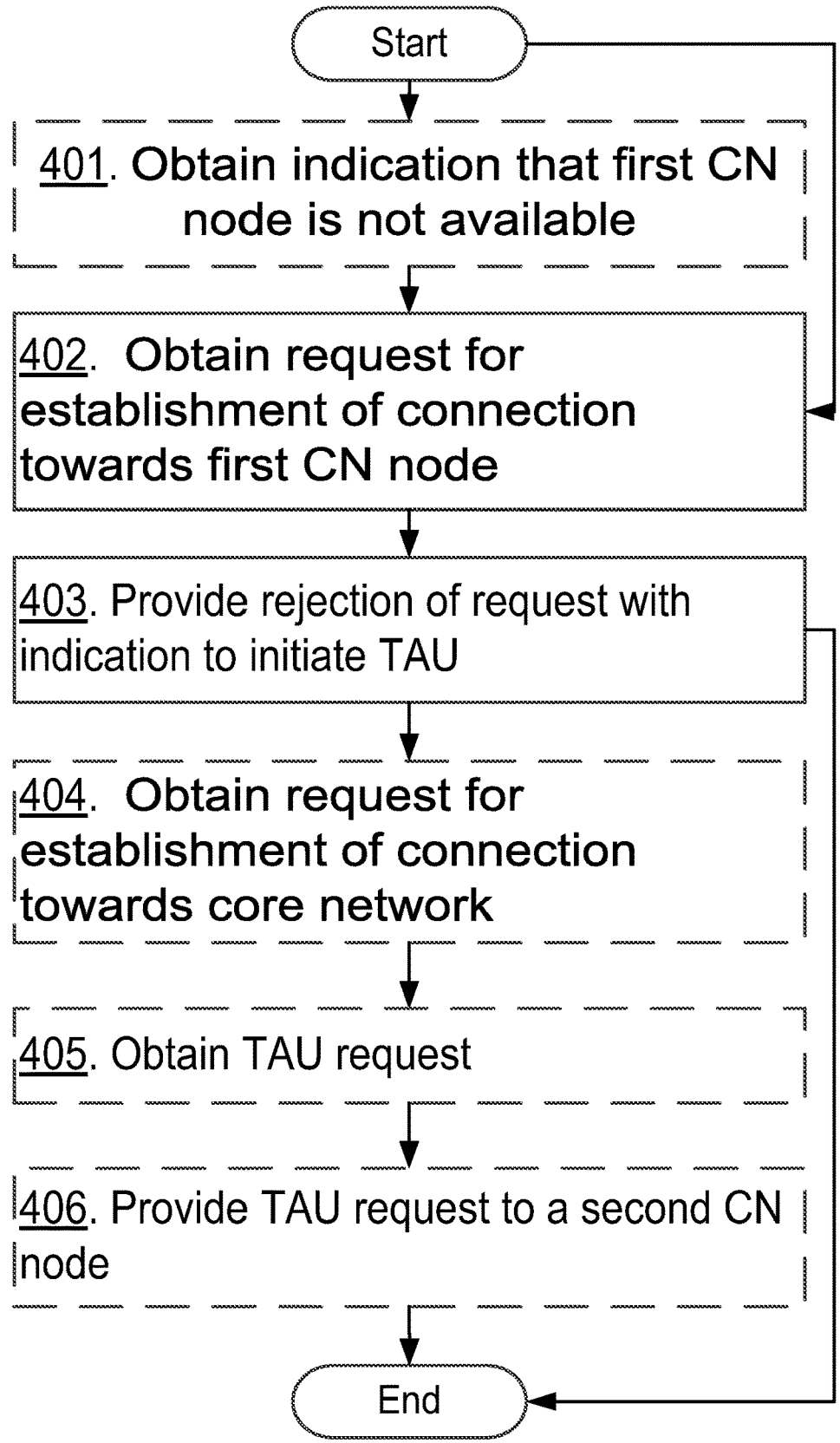
FIG. 4 is a flowchart illustrating embodiments of a method performed by a network node.

FIG. 4 is a flowchart that describes actions of the method which are performed by the network node 211 for enabling the establishment of a connection between the wireless communications device 220 and the core network 240 according to embodiments herein. Actions 401-406 relate to FIG. 4.

Figure 5:
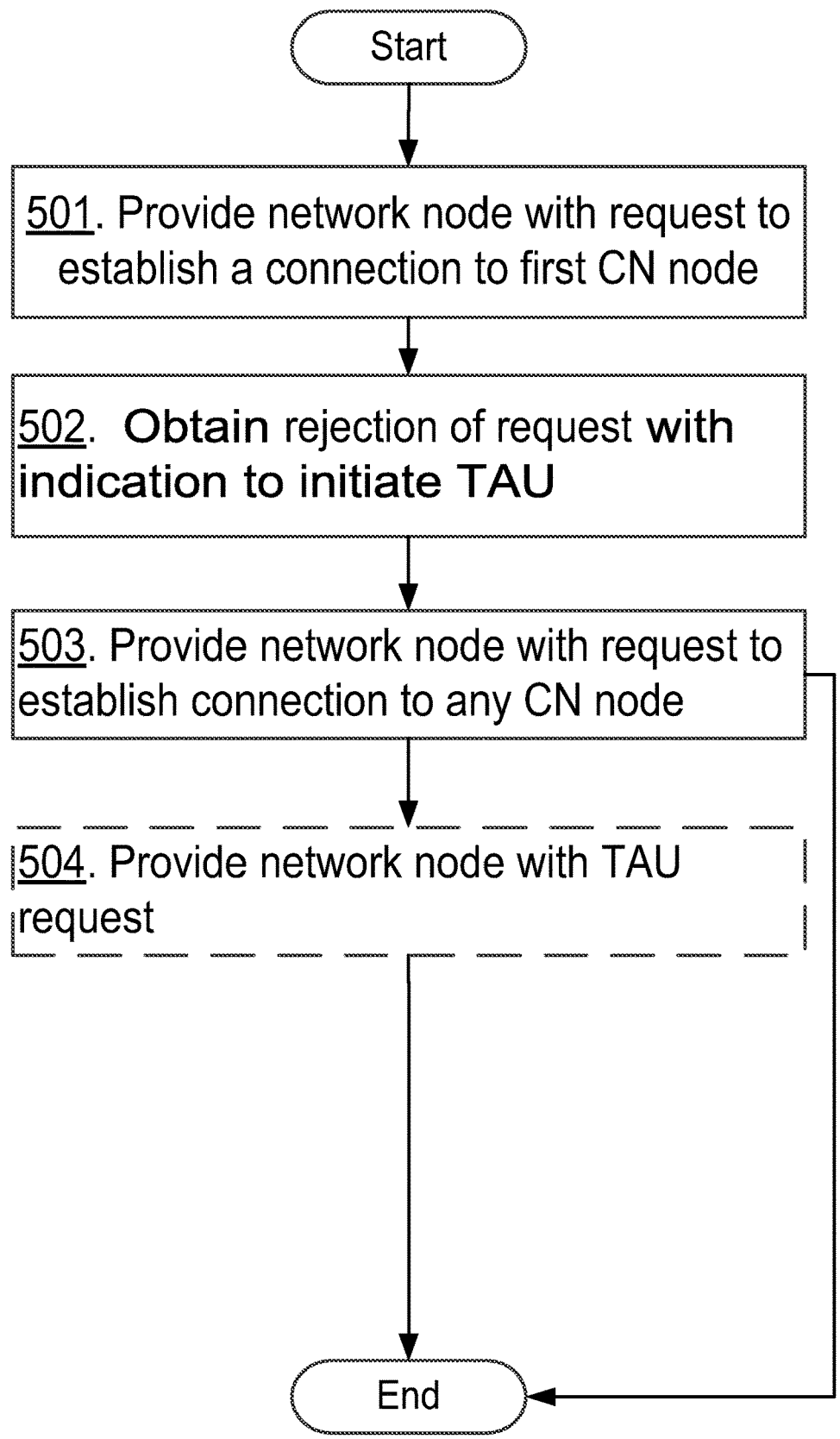
FIG. 5 is a flowchart illustrating embodiments of a method performed by a wireless communications device.

FIG. 5 is a flowchart that describes actions of the method which are performed by the wireless communications device 220 for enabling the establishment of a connection between the wireless communications device 220 and the core network 240 according to embodiments herein. Actions 501-504 relate to FIG. 5.

Actions 301, 401

As mentioned above, the network node 211 may obtain an indication 640 that the first core network node 241 is not available for connection to the wireless communications device 220.

In some embodiments the indication 640 that the first core network node 241 is not available for connection to the wireless communications device 220 is an indication 640a that the first core network node 241 is overloaded. For example, when an MME is overloaded it may send a message MME OVERLOAD START to an eNB to request the eNB not to initiate new connections towards the overloaded MME.

Thus when the first core network node 241 is an MME, the indication that the first core network node 241 is overloaded may be obtained in an MME overload start message.

In some other embodiments, the indication 640 that the first core network node 241 is not available for connection to the wireless communications device 220 is any one or more out of:

an indication 640b of a failure of the first connection 251 between the network node 211 and the first core network node 241;

an indication 640c of a failure of the first core network node 241; and an indication 640d of a removal of the first core network node 241 from an MME Pool 250.

Actions 302, 402, 501

The wireless communications device 220 provides the network node 211 with a request 340 to establish a connection to the first core network node 241. The term provide used in this document means transmit. In other words, the wireless communications device 220 transmits the request 340 to establish the connection to the first core network node 241. The request 340 is transmitted to the network node 211. The request 340 may be provided or transmitted as a signalling message.

As mentioned above, the first core network node 241 is not available for connection to the wireless communications device 220. However, the wireless communications device 220 does not know that the first core network node 241 is not available for connection to the wireless communications device 220.

The network node 211 obtains from the wireless communications device 220, the request 340 to establish the connection 261 to the first core network node 241 comprised in the core network 240. Since the first core network node 241 is not available for connection to the wireless communications device 220 the network node 211 will reject the request in action 403 below.

The request 340 from the wireless communications device 220 to establish the connection 261 to the first core network node 241 may be an RRC Connection request 340 comprising an S-TMSI 620 pointing to the first core network node 241. The S-TMSI 620 is used to locally and temporarily identify the wireless communications device 220. The S-TMSI 620 may point to the first core network node 241, e.g. if the first core network node 241 has been serving the wireless communications device 220 during the last RRC connection of the wireless communications device 220. S-TMSIs are unique within an MME Pool. The S-TMSI 620 is unique within the MME Pool 250.

Figure 6:
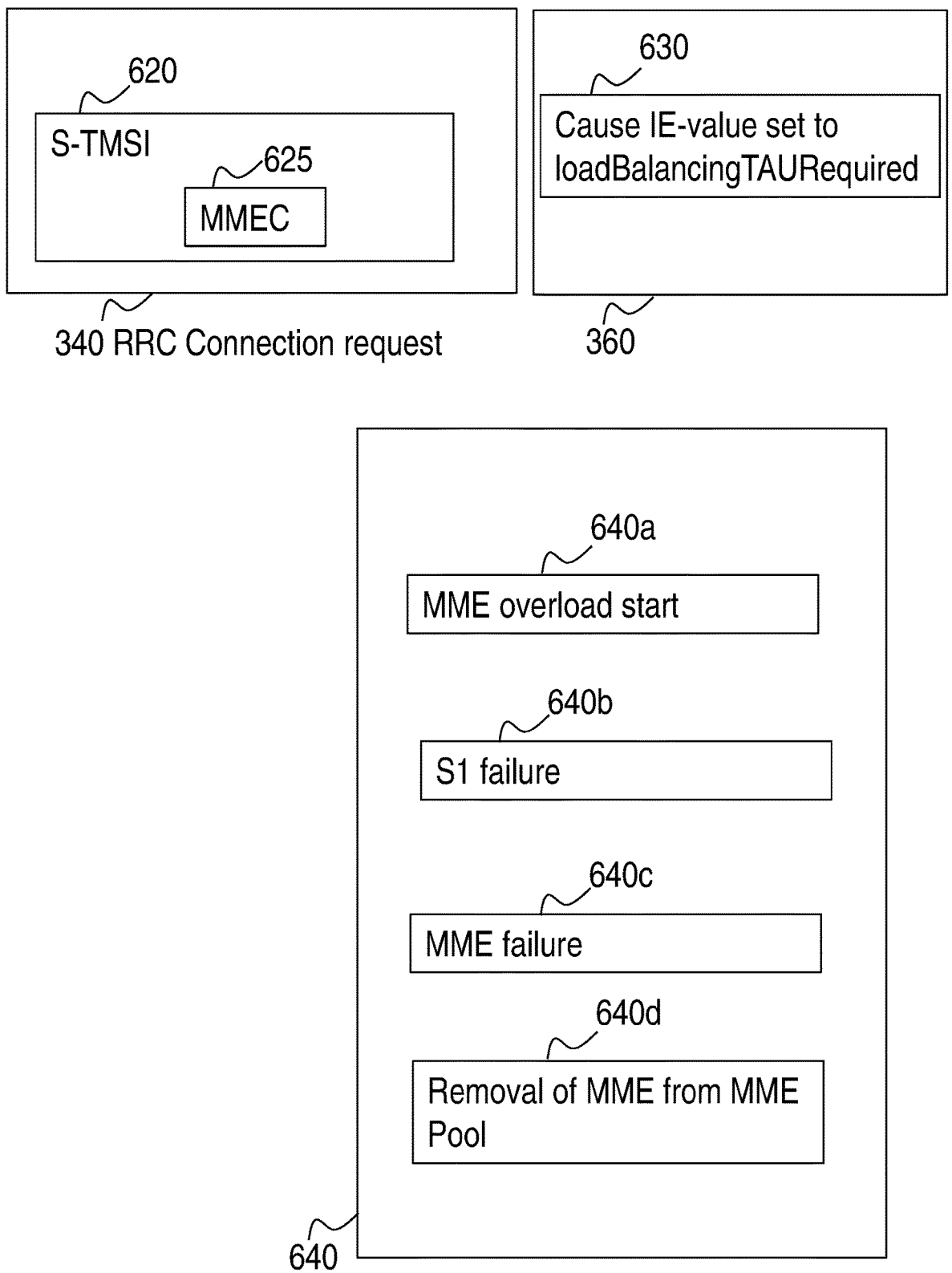
FIG. 6 is a schematic block diagram illustrating further embodiments of a method performed in a wireless communications network.

For example, when the first core network node 241 is an MME then an MMEC 625 corresponding to the first core network node 241 may be derived from the S-TMSI 620. The S-TMSI 620 may for example comprise the MMEC 625 as illustrated in FIG. 6.

Actions 303, 403, 502

The network node 211 provides the wireless communications device 220 with a rejection 350 of the request 340 to establish the connection 261 to the first core network node 241. The rejection 350 comprises an indication 630 to initiate a TAU.

The rejection 350 may be provided or transmitted as a signalling message.

The expression TAU may also be referred to as a TAU procedure. The TAU procedure is used to establish the same state in the wireless communications device 220 and in the core network 240. I.e. during the TAU procedure the wireless communications device 220 is assigned a new S-TMSI and the core network 240 finds out where the wireless communications device 220 is located on Tracking Area level. In that way the core network 240 knows where the wireless communications device 220 shall be paged in subsequent terminating connection attempts, e.g. a voice call to the wireless communications device 220. The TAU procedure further means that the wireless communications device 220 shall access the wireless communications network 200 and perform a TAU without information pointing to a particular core network node, such as the first core network node 241.

Since the rejection comprises the indication 630 to initiate the TAU the wireless communications device 220 is able to request the network node 211 to establish a connection 262, 263 to any core network node 242, 243 operating in the core network 240 and available for connection to the wireless communications device 220.

In other words the rejection comprises an indication to access the wireless communications network 200 without an indication of a specific core network node to connect to. Therefor the wireless communications device 220 is able to try to access the wireless communications network 200 with an RRC request without a pointer to a core network node, such as the first core network node 241.

Or in further other words, since the rejection comprises the indication 630 to initiate the TAU the wireless communications device 220 is prevented from trying to access the network with a pointer to a core network node and thus prevented from being rejected from accessing the wireless communications network 200 more than one time. This also enables the wireless communications device 220 to initiate the TAU procedure.

The wireless communications device 220 obtains 303, 502 the rejection 350 of the request to establish a connection to the first core network node 241 from the network node 211. In other words, the wireless communications device 220 receives 303, 502 the rejection 350 of the request to establish a connection to the first core network node 241.

The rejection comprises an indication 630 to initiate a TAU.

The rejection 350 of the request 340 to establish the connection 261 to the first core network node 241 may be an RRC Connection Reject.

The indication 630 to initiate the TAU may be a value of a Cause IE 360 which value is set to loadBalancingTAURequired. The value set to loadBalancingTAURequired indicates to the wireless communications device 220 to initiate the TAU without information pointing to any specific core network node. In that way a new core network node, such as an MME, is selected during the RRC Connection Establishment during the TAU procedure.

In some embodiments the network node 211 has obtained an indication 640 that the first core network node 241 is not available for connection to the wireless communications device 220. Then the network node 211 provides the wireless communications device 220 with the rejection 350 of the request to establish the connection 261 to the first core network node 241 based on the indication 640 that the first core network node 241 is not available for connection to the wireless communications device 220.

A Common Termination Function 721 in the network node 211 may receive and act upon the RRC connection request 340 from the wireless communications device 220. The acts taken by the Common Termination Function 721 may comprise providing the wireless communications device 220 with the rejection 350 of the request 340 to establish the connection 261 to the first core network node 241. The Common Termination Function 721 may further decode common messages, such as RRC Connection Requests and Handover Requests, determine if a new connection shall be granted access or not, and allocate identities, internal and external, for the wireless communications device 220.

Actions 304a, 404, 503

In response to the obtained indication 630 to initiate the TAU the wireless communications device 220 provides the network node 211 with a request 370 to establish the connection 262, 263 to any core network node 242, 243 operating in the core network 240 and available for connection to the wireless communications device 220. The request 370 may be provided or transmitted as a signalling message.

Correspondingly, the network node 211 may obtain the request 370 from the wireless communications device 220 to establish the connection 262, 263 to any core network node 242, 243 operating in the core network 240 and available for connection to the wireless communications device 220. As mentioned above, the request to establish the connection 262, 263 to any core network node 242, 243 operating in the core network 240 and available for connection to the wireless communications device 220 is obtained in response to the provided indication 630 to initiate the TAU.

The request 370 to establish the connection 262, 263 to any core network node 242, 243 operating in the core network 240 and available for connection to the wireless communications device 220 may be a second RRC Connection request 370 as illustrated in FIG. 3.

Further, in some embodiments the second RRC Connection request 370 comprises a TAU Request 380.

Actions 304b, 405, 504

In a further response to the obtained indication 630 to initiate the TAU, the wireless communications device 220 may provide the network node 211 with a TAU request 380. That is, if the TAU request 380 was not provided with e.g. the second RRC Connection request 370, then the TAU request 380 may be provided in a separate action. The TAU request 380 may be provided or transmitted as a signalling message.

Thus the network node 211 may obtain a TAU request 380 from the wireless communications device 220 in response to the provided indication 630 to initiate the TAU.

Action 305

In response to the request 370 from the wireless communications device 220 to establish the connection 262, 263 to any core network node 242, 243 available for connection to the wireless communications device 220, the network node 211 may transmit an RRC Connection Setup to the wireless communications device 211.

Action 306

In response to the RRC Connection Setup the wireless communications device 220 may transmit an RRC Connection Complete message to the network node 211.

Action 307

In some embodiments the network node 211 selects one of the core network nodes 242, 243 for the TAU procedure. For example, in FIG. 3 the network node 211 selects the second core network node 242.

A Non-access stratum Node Selection Function (NNSF) 731 in the network node 211 may select one of the core network nodes 242, 243 for the TAU procedure.

The selected core network node 242 will then serve the wireless communications device 220.

Actions 308

The network node 211 may request one out of the core network nodes 242, 243 available for connection to the wireless communications device 220 to establish the connection 262, 263 to the wireless communications device 220. The network node 211 bases the requesting on the request 370 for establishing the connection 262, 263 to any core network node 242, 243 operating in the core network 240 and available for connection to the wireless communications device 220. The request 370 for establishing the connection 262, 263 to any core network node 242, 243 operating in the core network 240 and available for connection to the wireless communications device 220 was obtained from the wireless communications device 220 in action 304a above.

For example in FIG. 3, the network node 211 requests the selected second core network node 242 to establish the connection 262 to the wireless communications device 220.

The requesting may be performed by providing one of the core network nodes 242, 243 operating in the core network 240 and available for connection to the wireless communications device 220 with a request in a signalling message. The signalling message may be transmitted to the core network nodes 242, 243. In some embodiments the network node 211 transmits the request in a signalling message to the selected second core network node 242.

The network node 211 may automatically provide such a request for establishing the connection to the selected second core network node 242 upon successful establishment of the RRC connection between the wireless communications device 220 and the network node 211.

The network node 211 may request one out of the core network nodes 242, 243 available for connection to the wireless communications device 220 by transmitting a signalling message comprising the request.

Actions 309/406

Further, the network node 211 may provide one out of the core network nodes 242, 243 available for connection to the wireless communications device 220 with the TAU request 380 obtained from the wireless communications device 220. The TAU request 380 was obtained in action 304a or 304b above. The TAU request 380 may be provided or transmitted as a signalling message.

Action 310

In response to the TAU request 380 the wireless communications device 220 may receive a TAU Accept 390 of the TAU request 380 which completes the TAU procedure. The TAU Accept 390 may be received as a signalling message.

FIG. 6 illustrates examples of what some of the signalling messages between the wireless communications device 220 and the network node 211 may comprise. The RRC Connection request 340 may for example comprise the S-TMSI 620 of the wireless communications device 220.

The indication 630 to initiate the TAU may be the value of the Cause IE 360 which value is set to loadBalancing-TAURequired.

The indication 640 that the first core network node 241 is not available for connection to the wireless communications device 220 may comprise:

the indication 640a that the first core network node 241 is overloaded.

the indication 640b of the failure of the first connection 251 between the network node 211 and the first core network node 241;

the indication 640c of the failure of the first core network node 241; and the indication 640d of the removal of the first core network node 241 from an MME Pool 250.

Figure 7:
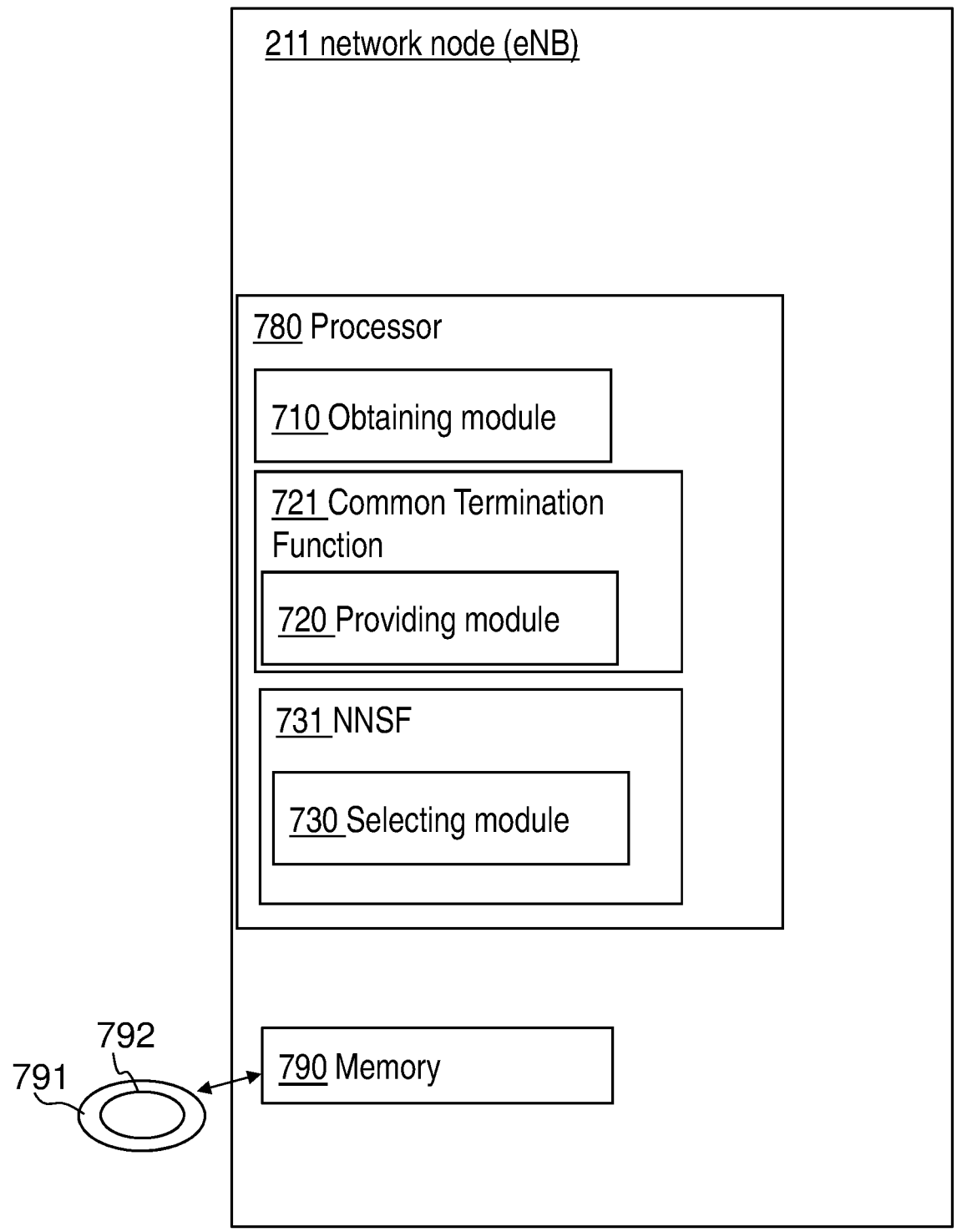
FIG. 7 is a schematic block diagram illustrating embodiments of a network node.

To perform the method actions for enabling establishment of a connection between a wireless communications device 220 and a core network 240 described above in relation to FIG. 3, FIG. 4 and FIG. 5, the network node 211 comprises the following arrangement depicted in FIG. 7.

The network node 211 and the wireless communications device 220 are each configured to operate in the wireless communications network 200 comprising the core network 240.

The network node 211 is configured to, e.g. by means of the obtaining module 710 configured to, obtain the request 340 from the wireless communications device 220 to establish the connection to the first core network node 241 comprised in the core network 240. As mentioned above the first core network node 241 is not available for connection to the wireless communications device 220.

In some embodiments, the request 340 from the wireless communications device 220 to establish the connection to the first core network node 241 is the RRC Connection request 340 comprising the S-TMSI 620 pointing to the first core network node 241.

The obtaining module 710 may be implemented by a receiver or a processor 780 in the network node 211.

The network node 211 is further configured to, e.g. by means of the providing module 720 configured to, provide the wireless communications device 220 with the rejection 350 of the request 340 to establish the connection to the first core network node 241. The rejection 350 comprises an indication 630 to initiate the TAU.

In some embodiments, the rejection 350 of the request 340 to establish the connection to the first core network node 241 is the RRC Connection Reject mentioned above.

The indication 630 to initiate the TAU may be the value of the Cause IE 360, which value is set to loadBalancing-TAURequired.

The network node 211 may provide the wireless communications device 220 with the rejection 350 of the request to establish the connection to the first core network node 241 based on the indication 640 that the first core network node 241 is not available for connection to the wireless communications device 220.

The providing module 720 may be implemented by the processor 780 in the network node 211. The providing module 720 may be further implemented by the Common Termination Function 721.

The network node 211 may be further configured to, e.g. by means of the obtaining module 710 configured to, obtain an indication 640 that the first core network node 241 is not available for connection to the wireless communications device 220.

In some embodiments, the indication 640 that the first core network node 241 is not available for connection to the wireless communications device 220 is an indication 640a that the first core network node 241 is overloaded.

When the first core network node 241 is an MME, the indication that the first core network node 241 is overloaded may be obtained in an MME overload start message.

In some other embodiments the indication 640 that the first core network node 241 is not available for connection to the wireless communications device 220 is any one or more out of:

an indication 640b of a failure of a first connection 251 between the network node 211 and the first core network node 241, an indication 640c of a failure of the first core network node 241, and an indication 640d of a removal of the first core network node 241 from an MME Pool Area 250.

The network node 211 may be further configured to, e.g. by means of the obtaining module 710 configured to, obtain the request 370 from the wireless communications device 220 to establish the connection 262, 263 to any core network node 242, 243 operating in the core network 240 and available for connection to the wireless communications device 220. The request is obtained in response to the provided indication 630 to initiate the TAU.

The network node 211 is further configured to, e.g. by means of the providing module 720 configured to, request one out of the core network nodes 242, 243 available for connection to the wireless communications device 220 to establish the connection 262, 263 to the wireless communications device 220. The network node 211 bases the requesting on the request 370 for establishing the connection 262, 263 to any core network node 242, 243 operating in the core network 240 and available for connection to the wireless communications device 220.

The network node 211 may be further configured to, e.g. by means of the obtaining module 710 configured to, obtain a TAU request 380 from the wireless communications device 220 in response to the provided indication 630 to initiate the TAU.

The network node 211 is further configured to, e.g. by means of the providing module 720 configured to, provide one out of the core network nodes 242, 243 available for connection to the wireless communications device 220 with the TAU request 380 from the wireless communications device 220.

The network node 211 may further be configured to, e.g. by means of a selecting module 730 configured to, select one of the core network nodes 242, 243 for the TAU procedure.

The selecting module 730 may be implemented by the processor 780 in the network node 211. The selecting module 730 may be further implemented by the NNSF 731.

The network node 211 may further comprise a memory 790 comprising one or more memory units. The memory 790 is configured to store information obtained from for example the wireless communications device 220 and the core network nodes 241, 242, 243. Such information may be information about obtained indications, identities of wireless communication devices, such as the S-TMSI 620 and identities of core network nodes, such as the MMEC 625.

The memory 790 may also store configurations, schedulings and applications etc. to perform the methods herein when being executed in the network node 211.

The embodiments herein for enabling establishment of a connection between a wireless communications device 220 and a core network 240 may be implemented through one or more processors, such as the processor 780 in the network node 211 depicted in FIG. 7 together with computer program code for performing the functions and actions of the embodiments herein. The program code mentioned above may also be provided as a computer program product 791 for instance in the form of a data carrier carrying computer program code 792 for performing the embodiments herein when being loaded into the network node 211. One such carrier may be in the form of a CD ROM disc. It is however feasible with other data carriers such as a memory stick. The computer program code may furthermore be provided as pure program code on a server and downloaded to the network node 211.

Thus, the methods according to the embodiments described herein for the network node 211 may be implemented by means of a computer program product, comprising instructions, i.e., software code portions, which, when executed on at least one processor, cause the at least one processor to carry out the actions described herein, as performed by the network node 211. The computer program product may be stored on a computer-readable storage medium. The computer-readable storage medium, having stored there on the computer program, may comprise the instructions which, when executed on at least one processor, cause the at least one processor to carry out the actions described herein, as performed by the network node 211. In some embodiments, the computer-readable storage medium may be a non-transitory computer-readable storage medium.

Those skilled in the art will also appreciate that the obtaining module 710, the providing module 720, and the selecting module 730 described above may refer to a combination of analogue and digital circuits, and/or one or more processors configured with software and/or firmware, e.g. stored in the memory 790 that when executed by the one or more processors such as the processor 780 perform as described above. One or more of these processors, as well as the other digital hardware, may be included in a single ASIC, or several processors and various digital hardware may be distributed among several separate components, whether individually packaged or assembled into a SoC.

Figure 8:
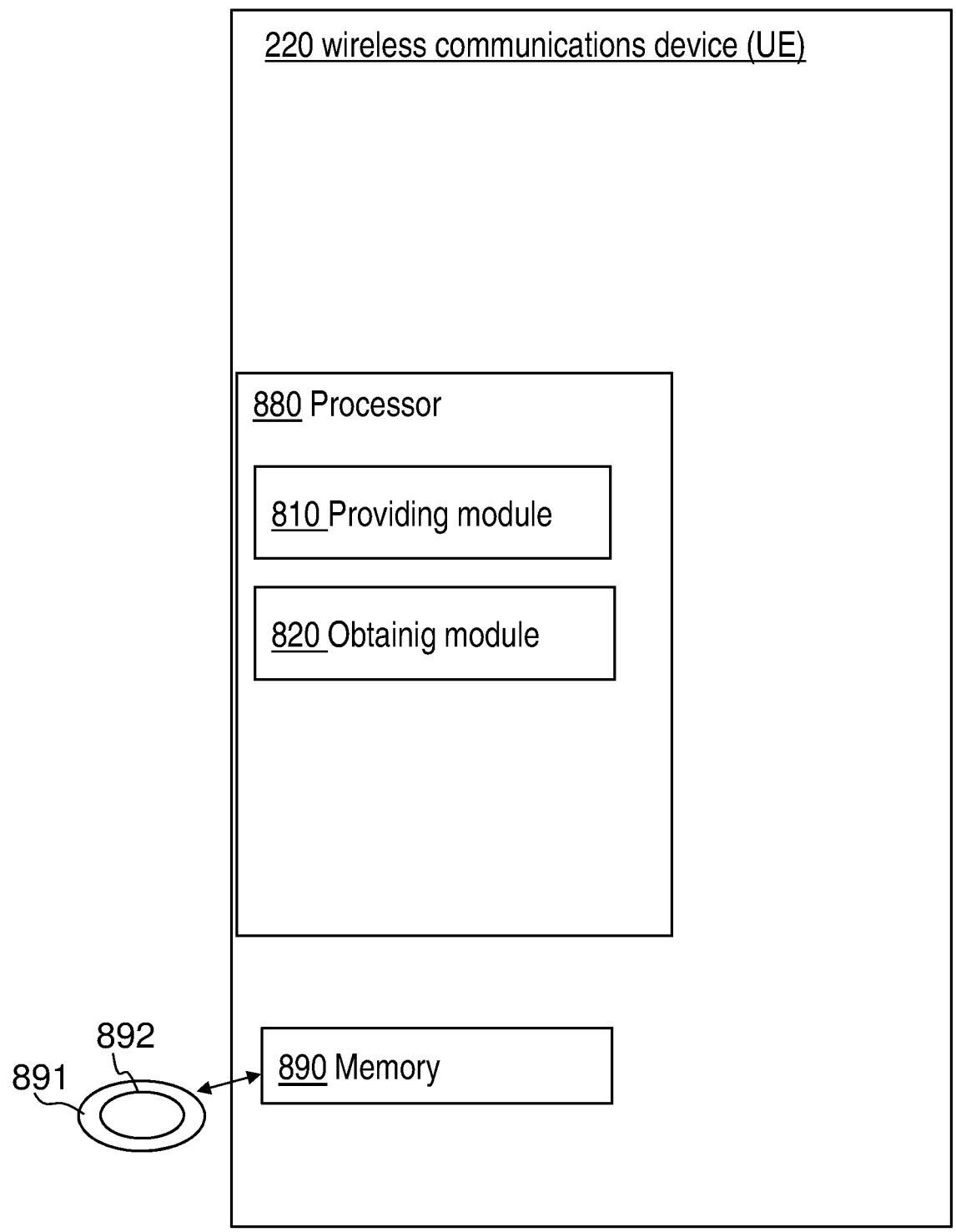
FIG. 8 is a schematic block diagram illustrating embodiments of a wireless communications device.

To perform the method actions for enabling establishment of a connection between a wireless communications device 220 and a core network 240 described above in relation to FIG. 3, FIG. 4 and FIG. 5, the wireless communications device 220 comprises the following arrangement depicted in FIG. 8.

The network node 211 and the wireless communications device 220 are each configured to operate in the wireless communications network 200 comprising the core network 240.

The wireless communications device 220 is configured to, e.g. by means of the providing module 810 configured to, provide the network node 211 with a request to establish a connection to a first core network node 241, which first core network node 241 is not available for connection to the wireless communications device 220.

In some embodiments, the request from the wireless communications device 220 to establish the connection to the first core network node 241 is an RRC Connection request comprising an S-TMSI pointing to the first core network node 241.

The providing module 810 may be implemented by a receiver or a processor 880 in the wireless communications device 220.

The wireless communications device 220 is further configured to, e.g. by means of the obtaining module 820 configured to, obtain a rejection 350 of the request to establish a connection to the first core network node 241 from the network node 211, which rejection comprises an indication 630 to initiate a Tracking Area Update, TAU.

When the wireless communications device 220 has provided the RRC Connection request comprising the S-TMSI pointing to the first core network node 241, then the rejection of the request 340 to establish the connection to the first core network node 241 is the RRC Connection Reject.

The indication 630 to initiate the TAU may be the value of the Cause IE 360, which value is set to loadBalancing-TAURequired.

The obtaining module 820 may be implemented by the processor 880 in the wireless communications device 220.

The network node 211 is further configured to, e.g. by means of the providing module 810 configured to, provide the network node 211 with a request 370 to establish a connection 262, 263 to any core network node 242, 243 operating in the core network 240 and available for connection to the wireless communications device 220, in response to the obtained indication 630 to initiate the TAU.

The network node 211 may be further configured to, e.g. by means of the providing module 810 configured to, provide the network node 211 with the TAU request 380, in response to the obtained indication 630 to initiate the TAU.

The wireless communications device 220 may further comprise a memory 890 comprising one or more memory units. The memory 890 is configured to store information obtained from for example the network node 211 and the core network nodes 241, 242, 243. Such information may be information about obtained indications, identities of wireless communication devices, such as the S-TMSI 620 and identities of core network nodes, such as the MMEC 625.

The memory 890 may also store configurations, schedulings and applications etc. to perform the methods herein when being executed in the wireless communications device 220.

The embodiments herein for enabling establishment of the connection between the wireless communications device 220 and a core network 240 may be implemented through one or more processors, such as the processor 880 in the wireless communications device 220 depicted in FIG. 8 together with computer program code for performing the functions and actions of the embodiments herein. The program code mentioned above may also be provided as a computer program product 891 for instance in the form of a data carrier carrying computer program code 892 for performing the embodiments herein when being loaded into the network node 211. One such carrier may be in the form of a CD ROM disc. It is however feasible with other data carriers such as a memory stick. The computer program code may furthermore be provided as pure program code on a server and downloaded to the wireless communications device 220.

Thus, the methods according to the embodiments described herein for the wireless communications device 220 may be implemented by means of a computer program product, comprising instructions, i.e., software code portions, which, when executed on at least one processor, cause the at least one processor to carry out the actions described herein, as performed by the wireless communications device 220. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communications device 220. In some embodiments, the computer-readable storage medium may be a non-transitory computer-readable storage medium.

Those skilled in the art will also appreciate that the providing module 810 and the obtaining module 820 described above may refer to a combination of analogue and digital circuits, and/or one or more processors configured with software and/or firmware, e.g. stored in the memory 890 that when executed by the one or more processors such as the processor 880 perform as described above. One or more of these processors, as well as the other digital hardware, may be included in a single ASIC, or several processors and various digital hardware may be distributed among several separate components, whether individually packaged or assembled into a SoC.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first core network node and a second core network node should be considered to be non-limiting and does in particular not imply a certain hierarchical relation between the two.

The invention claimed is:

1. A method performed by a network node for enabling establishment of a connection between a wireless communications device and a core network, the network node and the wireless communications device operate in a wireless communications network comprising the core network, the method comprising:

obtaining an indication that a first core network node is not available for a connection to the wireless communications device, wherein the indication that the first core network node is not available for the connection to the wireless communications device is an indication that the first core network node is overloaded;

obtaining a request, from the wireless communications device, to establish the connection to the first core network node comprised in the core network, the first core network node not being available for the connection to the wireless communications device;

providing the wireless communications device with a rejection of the request to establish the connection to the first core network node, based on the indication that the first core network node is not available for the connection to the wireless communications device, the rejection comprising an indication to initiate a Tracking Area Update (TAU), the TAU to be initiated by the wireless communications device without reference to a particular core network node in the core network, wherein during the TAU, the wireless communications device is assigned a new System Architecture Evolution Temporary Mobile Subscriber Identity (S-TMSI) to locate the wireless communications device on a Tracking Area Level;

obtaining a request, from the wireless communications device, to establish a connection to any core network node, operating in the core network, available for the connection to the wireless communications device, the request being obtained in response to the provided indication to initiate the TAU;

obtaining a TAU request, from the wireless communications device, in response to the provided indication to initiate the TAU; and providing one out of core network nodes, available for the connection to the wireless communications device, with the TAU request obtained from the wireless communications device.

2. The method according to claim 1, wherein the request, from the wireless communications device, to establish the connection to the first core network node is a Radio Resource Control (RRC) Connection request comprising an S-TMSI pointing to the first core network node, and wherein the rejection of the request to establish the connection to the first core network node is an RRC Connection Reject.

3. The method according to claim 1, wherein the indication to initiate the TAU is a value of a Cause Information Element (Cause IE), and wherein the value is set to loadBalancingTAURequired.

4. The method according to claim 1, wherein the first core network node is a Mobility Management Entity (MME) and the indication that the first core network node is overloaded is obtained in an MME overload start message.

5. The method according to claim 1, wherein the indication that the first core network node is not available for the connection to the wireless communications device is at least one out of:
 an indication of a failure of a first connection between the network node and the first core network node;
 an indication of a failure of the first core network node; and
 an indication of a removal of the first core network node from an MME Pool.

6. The method according to claim 1, further comprising:
 requesting, the one out of the core network nodes available for the connection to the wireless communications device, to establish the connection to the wireless communications device, based on the request, from the wireless communications device, for establishing the connection to any core network node, operating in the core network, available for the connection to the wireless communications device.

7. A network node for enabling establishment of a connection between a wireless communications device and a core network, the network node and the wireless communications device being configured to operate in a wireless communications network comprising the core network, the network node being configured to:
 obtain an indication that a first core network node is not available for a connection to the wireless communications device, wherein the indication that the first core network node is not available for the connection to the wireless communications device is an indication that the first core network node is overloaded;
 obtain a request, from the wireless communications device, to establish the connection to the first core network node comprised in the core network, the first core network node not being available for the connection to the wireless communications device;
 provide the wireless communications device with a rejection of the request to establish the connection to the first core network node, based on the indication that the first core network node is not available for the connection to the wireless communications device, the rejection comprising an indication to initiate a Tracking Area Update (TAU), the TAU to be initiated by the wireless communications device without reference to a particular core network node in the core network, wherein during the TAU, the wireless communications device is assigned a new System Architecture Evolution Temporary Mobile Subscriber Identity (S-TMSI) to locate the wireless communications device on a Tracking Area Level;
 obtain a request, from the wireless communications device, to establish a connection to any core network node, operating in the core network, available for the connection to the wireless communications device, the request being obtained in response to the provided indication to initiate the TAU;
 obtain a TAU request, from the wireless communications device, in response to the provided indication to initiate the TAU; and
 provide one out of core network nodes, available for the connection to the wireless communications device, with the TAU request obtained from the wireless communications device.

8. The network node according to claim 7, wherein the request from the wireless communications device to establish the connection to the first core network node is a Radio Resource Control (RRC) Connection request comprising an S-TMSI pointing to the first core network node, and wherein the rejection of the request to establish the connection to the first core network node is an RRC Connection Reject.

9. The network node according to claim 7, wherein the indication to initiate the TAU is a value of a Cause Information Element (Cause IE), and wherein the value is set to loadBalancingTAURequired.

10. The network node according to claim 7, further configured to:
 request, the one out of the core network nodes available for the connection to the wireless communications device, to establish the connection to the wireless communications device, based on the request, from the wireless communications device, for establishing the connection to any core network node, operating in the core network, available for the connection to the wireless communications device.

11. A method performed by a wireless communications device for enabling establishment of a connection between the wireless communications device and a core network, a network node and the wireless communications device operate in a wireless communications network comprising the core network, the method comprising:
 providing the network node with a request to establish a connection to a first core network node, the first core network node not being available for the connection to the wireless communications device;
 obtaining, from the network node, a rejection, of the request to establish the connection to the first core network node, based on an indication that the first core network node is not available for the connection to the wireless communications device, wherein the indication that the first core network node is not available for the connection to the wireless communications device is an indication that the first core network node is overloaded, wherein the rejection comprises an indication to initiate a Tracking Area Update (TAU), the TAU to be initiated by the wireless communications device without reference to a particular core network node in the core network, and wherein during the TAU, the wireless communications device is assigned a new System Architecture Evolution Temporary Mobile Subscriber Identity (S-TMSI) to locate the wireless communications device on a Tracking Area Level;

providing the network node with a request to establish a connection to any core network node, operating in the core network, available for the connection to the wireless communications device, in response to the obtained indication to initiate the TAU; and providing the network node with a TAU request, in response to the obtained indication to initiate the TAU.

12. The method according to claim 11, wherein the request, from the wireless communications device, to establish the connection to the first core network node is a Radio Resource Control (RRC) Connection request comprising an S-TMSI pointing to the first core network node, and wherein the rejection of the request to establish the connection to the first core network node is an RRC Connection Reject.

13. The method according to claim 11, wherein the indication to initiate the TAU is a value of a Cause Information Element (Cause IE), and wherein the value is set to loadBalancingTAURequired.

14. A wireless communications device for enabling establishment of a connection between the wireless communications device and a core network, a network node and the wireless communications device operate in a wireless communications network comprising the core network, the wireless communications device being configured to:

provide the network node with a request to establish a connection to a first core network node, the first core network node not being available for the connection to the wireless communications device;

obtain, from the network node, a rejection, of the request to establish the connection to the first core network node, based on an indication that the first core network node is not available for the connection to the wireless communications device, wherein the indication that the first core network node is not available for the connection to the wireless communications device is an indication that the first core network node is overloaded, wherein the rejection comprises an indication to initiate a Tracking Area Update (TAU), the TAU to be initiated by the wireless communications device without reference to a particular core network node in the core network, and wherein during the TAU, the wireless communications device is assigned a new System Architecture Evolution Temporary Mobile Subscriber Identity (S-TMSI) to locate the wireless communications device on a Tracking Area Level;

provide the network node with a request to establish a connection to any core network node, operating in the core network, available for the connection to the wireless communications device, in response to the obtained indication to initiate the TAU; and provide the network node with a TAU request, in response to the obtained indication to initiate the TAU.

15. The wireless communications device according to claim 14, wherein the request, from the wireless communications device, to establish the connection to the first core network node is a Radio Resource Control (RRC) Connection request comprising an S-TMSI pointing to the first core network node, and wherein the rejection of the request to establish the connection to the first core network node is an RRC Connection Reject.

* * * * *